US011896856B2

(12) United States Patent
Phifer et al.

(10) Patent No.: US 11,896,856 B2
(45) Date of Patent: Feb. 13, 2024

(54) HIGH PRESSURE AIR CYLINDERS FOR USE WITH SELF-CONTAINED BREATHING APPARATUS

(71) Applicant: SCOTT TECHNOLOGIES, INC., Monroe, NC (US)

(72) Inventors: Jerry A. Phifer, Peachland, NC (US); William E. Parson, Indian Trail, NC (US); Ronald B. Mele, Waxhaw, NC (US)

(73) Assignee: Scott Technologies, Inc., Monroe, NC (US)

( * ) Notice: Subject to any disclaimer, the term of this patent is extended or adjusted under 35 U.S.C. 154(b) by 0 days.

(21) Appl. No.: 17/854,172

(22) Filed: Jun. 30, 2022

(65) Prior Publication Data

US 2022/0331617 A1 Oct. 20, 2022

Related U.S. Application Data

(63) Continuation of application No. 16/435,118, filed on Jun. 7, 2019, now Pat. No. 11,376,448, which is a
(Continued)

(51) Int. Cl.
*A62B 7/02* (2006.01)
*A62B 9/02* (2006.01)
(Continued)

(52) U.S. Cl.
CPC ................ *A62B 7/02* (2013.01); *A62B 9/022* (2013.01); *A62B 9/04* (2013.01); *A62B 18/02* (2013.01);
(Continued)

(58) Field of Classification Search
CPC .. A62B 7/02; A62B 9/022; A62B 9/04; A62B 18/02; F17C 1/00;
(Continued)

(56) References Cited

U.S. PATENT DOCUMENTS

| | | | |
|---|---|---|---|
| 3,762,604 | A | 10/1973 | Shonerd |
| 3,843,010 | A | 10/1974 | Morse et al. |

(Continued)

FOREIGN PATENT DOCUMENTS

| | | | |
|---|---|---|---|
| DE | 3417823 | A1 | 3/1985 |
| EP | 1293410 | B1 | 7/2004 |

(Continued)

OTHER PUBLICATIONS

"Gas cylinders—Composite construction—Periodic inspection and testing", BSI Standards Publication, May 2018, pp. 1-28.

(Continued)

*Primary Examiner* — Valerie L Woodward

(57) ABSTRACT

A self-contained breathing apparatus includes an air cylinder pressurized to about 5500 psi, wherein the air cylinder is compatible with infrastructure used in conjunction with the air cylinder. The self-contained breathing apparatus also includes a first regulator valve for reducing air pressure from the air cylinder to a predetermined level. A second regulator valve is also provided for reducing the air pressure from the predetermined level to a level suitable for use by an operator, wherein air is supplied from the second regulator valve to the operator via a mask. The self-contained breathing apparatus further includes a frame for supporting the air cylinder on the back of the operator. Other embodiments are described and claimed.

17 Claims, 13 Drawing Sheets

Related U.S. Application Data continuation of application No. 16/017,760, filed on Jun. 25, 2018, now Pat. No. 11,471,709, which is a continuation of application No. 14/644,139, filed on Mar. 10, 2015, now Pat. No. 10,016,628, which is a continuation of application No. 13/217,703, filed on Aug. 25, 2011, now Pat. No. 9,004,068.

(60) Provisional application No. 61/519,603, filed on May 25, 2011.

(51) Int. Cl.
*A62B 18/02* (2006.01)
*A62B 9/04* (2006.01)
*F17C 1/00* (2006.01)

(52) U.S. Cl.
CPC ........ *F17C 1/00* (2013.01); *F17C 2201/0128* (2013.01); *F17C 2270/025* (2013.01)

(58) Field of Classification Search
CPC ........ F17C 2201/0128; F17C 2201/058; F17C 2260/012; F17C 2260/018; F17C 2270/025
See application file for complete search history.

(56) References Cited

U.S. PATENT DOCUMENTS

| | | | | |
|---|---|---|---|---|
| 4,221,216 | A | 9/1980 | Kranz | |
| 4,964,405 | A | 10/1990 | Arnoth | |
| 5,036,845 | A | 8/1991 | Scholley | |
| 5,557,685 | A | 9/1996 | Schlossers et al. | |
| 5,570,685 | A | 11/1996 | Turiello | |
| 5,613,490 | A * | 3/1997 | Mayes | A62B 7/02 220/582 |
| 6,401,963 | B1 | 6/2002 | Seal et al. | |
| 6,425,172 | B1 | 7/2002 | Rutz | |
| RE38,433 | E | 2/2004 | Seal et al. | |
| 6,932,128 | B2 | 8/2005 | Turan, Jr. | |
| 7,156,094 | B2 | 1/2007 | Chomyj et al. | |
| 7,370,662 | B2 | 5/2008 | Mele | |
| 7,637,164 | B1 | 12/2009 | Reilly | |
| 7,641,949 | B2 | 1/2010 | DeLay et al. | |
| 7,647,927 | B2 | 1/2010 | Teetzel et al. | |
| 7,896,190 | B2 | 3/2011 | Berger et al. | |
| 9,004,068 | B2 | 4/2015 | Phifer et al. | |
| 2002/0153009 | A1 * | 10/2002 | Chornyj | A62B 7/02 128/206.28 |
| 2004/0000343 | A1 | 1/2004 | Turan | |
| 2005/0022817 | A1 | 2/2005 | Alvey | |
| 2005/0087536 | A1 | 4/2005 | Caudill et al. | |
| 2006/0213513 | A1 | 9/2006 | Seong | |
| 2007/0101995 | A1 | 5/2007 | Chomyj | |
| 2007/0235030 | A1 | 10/2007 | Teetzel et al. | |
| 2008/0277036 | A1 | 11/2008 | Johansen | |
| 2009/0133730 | A1 | 5/2009 | McVey | |
| 2010/0024822 | A1 * | 2/2010 | Leon | A62B 7/02 128/205.24 |
| 2010/0224193 | A1 | 9/2010 | Teetzel et al. | |
| 2010/0276434 | A1 | 11/2010 | Berger et al. | |
| 2011/0056960 | A1 | 3/2011 | Blanc et al. | |
| 2011/0309074 | A1 | 12/2011 | Thunhorst et al. | |
| 2014/0008373 | A1 | 1/2014 | Sharp et al. | |
| 2014/0076322 | A1 | 3/2014 | Phifer et al. | |
| 2015/0182764 | A1 | 7/2015 | Phifer et al. | |
| 2016/0038774 | A1 | 2/2016 | Phifer et al. | |

FOREIGN PATENT DOCUMENTS

| | | | |
|---|---|---|---|
| WO | 200281029 | B1 | 10/2002 |
| WO | 2008061021 | B2 | 5/2008 |

OTHER PUBLICATIONS

"Gas cylinders of composite construction—Specification and test methods—Part 2: Fully wrapped fibre reinforced composite gas cylinders with load-sharing metal liners", International Standard ISO 11119-2 (May 15, 2002) pp. i-v, 1-29.

"Gas cylinders of composite construction—Specification and test methods—Part 3: Fully wrapped fibre reinforced composite gas cylinders with non-load-sharing metallica or non-metallic liners", International Standard ISO 11119-3, (Sep. 15, 2002), pp. i-v, 1-33.

"Spirolite Cylinders—Full Composite Cyclinders", Interspiro information sheet, Oct. 15, 2006.

EP Ltr to Opponent, Martin Nicholas Hedges dated Aug. 26, 2022 for Appeal No. TO169/22-3.2.04 which is a reply to appeal enclosing new cited references D25-D29.

Third Party observations of Nov. 25, 2021 regarding a divisional application of the patent as an EPO Submission to Application No. EP18191553.9 including Evidence Nos. and D7, D8, D8A, D9, D10, D11, D18 and D23, (Nov. 25, 2021), pp. 1-9 and D7, D8, D8A, D9, D10, D11, D18 and D23.

Third Party Observations for co-pending EP18191553.9, 4 pages, Sep. 30, 2021.

"5500 psig Operating Systems", MSA The Safety Company, Feb. 2012, 2 pages.

"Standard for Compressed Gas Cylinder Valve Outlet and Inlet Connections", CGA V-1-2005, Twelfth Edition, Compressed Gas Association, Inc., Amendment 3, Mar. 5, 2012, 160 pages.

"Zamowienie nr Z/11/07/10", Order No. Z/11/07/10, Jul. 13, 2010, 1 page.

"Declaration of Dawid Saferna Concerning EP 2714203 and Opposition Thereto by Draeger Safety UK Limited", Jun. 24, 2020, 3 pages.

Table which gives comparative data for the improvement in compressed volume change for different cylinder operating pressures, Aug. 24, 2011, 1 page.

International Search Report and Written Opinion Recd for PCT Pat Appl. No. PCT/US2012/037977, dated Jul. 23, 2012, 9 pages.

North Frontier Technical Data Manual, Apr. 17, 2008; retrieved from the internet at: /www.thermalgas.com/files/scba/Frontier%20Tech%Data%5B1%5D.pdf on Jul. 10, 2012.

Marino, Dominick, (Oct. 1, 2006) Air Management: Know Your Air-Consumption Rate, Retrieved from http://www.fireengingeering.com/articles/print/volume-159/issue-10/features/air-management-know-your-air-consumption-rate.html.

U.S. Appl. No. 14/644,139, filed Mar. 10, 2015, Co-Pending Related to U.S. Appl. No. 14/088,537.

U.S. Appl. No. 14/644,144, filed Mar. 10, 2015, (Publication No. 2015-0182764), Co-Pending Related to U.S. Appl. No. 14/088,537.

U.S. Appl. No. 14/644,149, filed Mar. 10, 2015, (Publication No. 2016-0038774), Co-Pending Related to U.S. Appl. No. 14/088,537.

U.S. Appl. No. 14/644,154, filed Mar. 10, 2015, Co-Pending Related to U.S. Appl. No. 14/088,537.

European Patent Office, IFW of corresponding EP Application No. 12788775.0, dated Mar. 9. 2017: 180 pages.

United States Patent Office, IFW of U.S. Appl. No. 61/519,603, filed Mar. 9, 2017; 22 pages.

United States Patent Office, IFW of U.S. Appl. No. 13/217,703, filed Mar. 9, 2017; 281 pages.

European Patent Office, Extended European Search in corresponding EP Appl. No, 12788775.0, dated Jul. 13, 2015; 8 pages.

Chinese Patent Office, First Office Action and English Translation in corresponding CN Appl. No. 201280025539.1, dated Mar. 31, 2015, 18 pages.

ADR—European Agreement for the Transport of Dangerous Goods (ADR), Packing Instruction P200, (660 pages), (Jan. 1, 2011).

British Standard EN 13099:2003, "Transportable gas cylinders—Conditions for filling gas mixtures into receptables", (34 pages) (Jan. 14, 2004).

British Standard EN 12245:2009 +A1:2011, "Transportable gas cylinders—Fully wrapped composite cylinders", British Standard EN 12245:2009 +AI :2011 (Apr. 30, 2012).

(56) References Cited

OTHER PUBLICATIONS

Declaration of Conformity from Techplast Sp. to Sperian Protection Respiratory Polska SP., referencing technical drawing AS1-01-00 of D9, providing date of production of Jul. 2010, and serial numbers of Cylinders (Aug. 19, 2010).
DOT-CFFC Basic Requirements (Fifth Revision) Appendix A—Basic Requirements for Fully Wrapped Carbon-Fiber Reinforced Aluminum Lined Cylinders (DOT-CFFC) pp. 1-33, (Mar. 2007).
EC Certificate Reg. No. 01.192.309/10/06/05/0, Type Approval for Directive 97/23/EC for "Fully wrapped composite cylinders" denoted by drawing AS1-01-00 (May 27, 2010).
EC Certificate Reg. No. 4402/70/10/AW/AO/T regarding cylinders having serial numbers listed in D10 (Aug. 20, 2010).
IFSTA Essentials of Fire Fighting and Fire Department Operations, 5th Edition pgs. Cover pages and 190-192 (Jan. 2008).
Invoice From Techplast Sp. to Sperian Protection Respiratory Polska Sp. for 200 composite cylinders 01C (Sep. 15, 2010).
Knapik, et al., "Load carriage using packs: A review of physiological, biomechanical and medical aspects", Applied Ergonomics, vol. 27, No. 3, Jun. 1996, pp. 207-216; https://www.sciencedirect.com/science/article/pll/00036870960013 (Jun. 1996).
Love, Johnstone, Crawford, Tesh, Graveling, Ritchie, Hutchison, Wetherill, "Study of the physiological effects of wearing breathing apparatus", (Nov. 1, 1994), XP055530235, Retrieved from the Internet: URL:https://www.iom-world.org/pubstomitm_9405.pdf [retrieved on Dec. 5, 2018].
LCX User MANUAL:2003, Luxfer Gas Cylinders, pp. 1-52, (2003).
2008-2009 Safety Equipment Catalog, vol. 12, No. 1, Available at: www.ebarnett.com/ProductDocument/10148/295803_Brochure.pdf. pp. 1-204 (Oct. 2007).
Technical Drawing AS1-01-00 of the approved cylinder of D7 (May 12, 2010).
US CFR 49, Code of Federal Regulations Available at: https://www.govinfo.gov/app/details/CFR-2010-title49-vol2/CFR-2010-title49-vol2-part173 1 (Oct. 1, 2010).
Extended Search Report for EP Appl. No. 1819553.9—dated Dec. 12, 2018 (5 pages).
Communication of a notice of opposition dated Mar. 31, 2023, Application No. 18191553.9-1113, U.S. Pat. No. 3,424,565, pp. 1-32.

* cited by examiner

| Nominal Free Air [liters] | Rated Service Time [minutes] | Service Pressure [PSI] | Water Volume [$in^3$] | Weight [lbf] | Cylinder Mass [slugs] | Air Mass [slugs] | $r_1$ [in] | $r_2$ [in] | I [slugs-$in^2$] | change from $I_{4500}$ [%] |
|---|---|---|---|---|---|---|---|---|---|---|
| 1,200 | 30 | 4,500 | 285 | 6.6 | 0.20 | 0.10 | 4.0 | 2.77 | 13.99 | |
| 1,200 | 30 | 5,500 | 233 | 5.8 | 0.18 | 0.10 | 4.0 | 2.47 | 11.69 | -16.4 |
| 1,800 | 45 | 4,500 | 418 | 9.0 | 0.28 | 0.15 | 4.0 | 3.16 | 22.01 | |
| 1,800 | 45 | 5,500 | 349 | 7.8 | 0.24 | 0.15 | 4.0 | 3.05 | 19.57 | -11.1 |
| 2,400 | 60 | 4,500 | 550 | 11.6 | 0.36 | 0.20 | 4.0 | 3.42 | 30.93 | |
| 2,400 | 60 | 5,500 | 465 | 10.0 | 0.31 | 0.20 | 4.0 | 3.27 | 27.02 | -12.6 |

*FIG. 3*

| Current Cylinder External Dimensions | | | | | | | |
|---|---|---|---|---|---|---|---|
| Free Air (Liters) | Rated Service Time [min] | Service Pressure [psi] | Water Volume [$in^3$] | Length [in] | Diameter [in] | Radius [in] | Weight [lbf] |
| 1.200 | 30 | 4,500 | 285 | 18.55 | 5.53 | 2.77 | 6.6 |
| 1.200 | 30 | 5,500 | 233 | 18.90 | 4.94 | 2.47 | 5.8 |
| 1.800 | 45 | 4,500 | 418 | 20.80 | 6.32 | 3.16 | 9.0 |
| 1.800 | 45 | 5,500 | 349 | 18.80 | 6.10 | 3.05 | 7.8 |
| 2.400 | 60 | 4,500 | 550 | 21.70 | 7.05 | 3.53 | 11.6 |
| 2.400 | 60 | 5,500 | 465 | 21.21 | 6.53 | 3.27 | 10.0 |

| Rated Service Time [min] | Service Pressure [psi] | Compressed Volume Change | | | | | | | |
|---|---|---|---|---|---|---|---|---|---|
| | | 4,500-5,000 [$in^3$] | 4,500-5,500 [$in^3$] | 4,500-6,000 [$in^3$] | 4,500-6,500 [$in^3$] | 4,500-5,000 [$in^3$] | 4,500-5,500 [$in^3$] | 4,500-6,000 [$in^3$] | 4,500-6,500 [$in^3$] |
| 30 | 5,500 | 30 | 52 | 65 | 73 | 12.3 | 18.2 | 22.8 | 25.6 |
| 45 | 5,500 | 40 | 69 | 84 | 93 | 9.6 | 16.5 | 20.1 | 22.2 |
| 60 | 5,500 | 43 | 85 | 102 | 112 | 7.8 | 15.5 | 18.5 | 20.4 |

| | | Internal Dimensions | | | | | | |
|---|---|---|---|---|---|---|---|---|
| Nominal Free Air (Liters) | Rated Service Time [min] | Service Pressure [psi] | Cylinder Dimensions | | | | | |
| | | | $d_{min}$ [in] | $d_{max}$ [in] | $L_{min}$ [in] | $L_{max}$ [in] | $W_{min}$ [lbf] | $W_{max}$ [lbf] |
| 1.200 | 30 | 5,500 | 4.3 | 4.7 | 14.8 | 17.3 | 5.7 | 6.6 |
| 1.800 | 45 | 5,500 | 5.0 | 5.4 | 16.9 | 19.5 | 7.8 | 9.0 |
| 2,400 | 60 | 5,500 | 5.7 | 6.1 | 17.9 | 20.3 | 10.0 | 11.6 |
| 3,000 | 75 | 5,500 | 6.2 | 6.8 | 18.4 | 21.0 | 12.5 | 12.5 |

FIG. 10

HIGH PRESSURE AIR CYLINDERS FOR USE WITH SELF-CONTAINED BREATHING APPARATUS

CROSS-REFERENCE TO RELATED APPLICATIONS

This application is a continuation application of U.S. patent application Ser. No. 16/435,118, filed Jun. 7, 2019, now allowed, which is a continuation of pending prior application Ser. No. 16/017760, filed Jun. 25, 2018, now allowed, which is a continuation application of U.S. patent application Ser. No. 14/644139, filed Mar. 10, 2015, issued as U.S. Pat. No. 10,016,628 on Jul. 10, 2018, which is a continuation of U.S. patent application Ser. No. 13/217,703 filed Aug. 25, 2011, issued as U.S. Pat. No. 9,004,068 on Apr. 14, 2015, which claims the benefit of priority to U.S. Provisional Patent Application No. 61/519,603, filed May 25, 2011, the entirety of each is incorporated by reference herein.

FIELD OF THE DISCLOSURE

The present disclosure relates generally to self-contained breathing apparatus, and more particularly to self-contained breathing apparatus having an improved air cylinder configuration that is lighter and smaller than conventional air cylinders while providing desired air capacity and compatibility with existing infrastructure.

BACKGROUND OF THE DISCLOSURE

A self-contained breathing apparatus (SCBA) used by a firefighter generally includes a pressurized air cylinder for supplying breathable air, a pressure regulator, an inhalation connection (mouthpiece, mouth mask or face mask) and other devices mounted to a frame that is carried by the firefighter. The configuration of the air cylinder is typically a result of the consideration of several design factors. These include items such as size, weight, amount of air supply required, portability, compatibility with other standardized equipment and the like. Current air cylinders for firefighters are pressurized to approximately 2216 pounds per square inch (psi) or 4500 psi.

In use, it is desirable to provide a SCBA with sufficient air capacity that the user is not limited in his/her work by having to exit the site to obtain replacement air cylinders. Increased air capacity must, however, be balanced with the need to have a manageable SCBA both in terms of weight and space. In this regard, several configurations of air cylinders have been utilized to provide a desired air capacity. In one configuration, two standard size air cylinders are used to provide additional air capacity. In another configuration, multiple reduced profile air cylinders are used to provide improved maneuverability while maintaining desired capacity. Since these configurations require the use of more than one cylinder, however, they can undesirably result in increased weight. They also can be cumbersome to handle and can require the use of specialized equipment and the retraining of fire department personnel in order to assure proper operation.

In still other configurations, air cylinders are fabricated from specialized materials such as carbon fiber composite to provide a cylinder pressure of 9,500 psi or higher. Such configurations, while providing a desirable increased air capacity, also result in increased costs of production. Such configurations also may result in increased weight.

Thus, it would be desirable to provide an improved air cylinder having a reduced overall space envelope while maintaining existing air capacity. The resulting cylinder should be easy to use, inexpensive to manufacture and should be compliant with current cylinder charging infrastructure.

SUMMARY OF THE DISCLOSURE

A self-contained breathing apparatus is disclosed. The self-contained breathing apparatus includes an air cylinder capable of being pressurized to about 5400 psig (37 MPa) to about 6000 psig (41 MPa). In one exemplary embodiment, the air cylinder is capable of being pressurized to about 5500 psig (38 MPa). In another exemplary embodiment, the air cylinder is capable of being pressurized to about 5400 psig (37 MPa) to 5600 psig (39 MPa). The air cylinder is optimized for size and weight, and is compatible with infrastructure used in conjunction with conventional air cylinders. The self-contained breathing apparatus also includes a first regulator valve for reducing the pressure of air received from the air cylinder to a predetermined level. A second regulator valve is provided for reducing the pressure of air received from the first regulator valve to a level suitable for use by an operator. The air supplied from the second regulator valve is provided to the operator via a mask. The self-contained breathing apparatus further includes a frame for supporting the air cylinder on the back of the operator.

A compressed gas cylinder is disclosed. The cylinder may comprise a pressure volume portion for containing a volume of gas pressurized to a service pressure. The pressure volume portion may have a length, a diameter, and a water volume selected according to the formula:

$$L = \frac{4\left(V - \frac{\pi d^3}{6}\right)}{\pi d^2} + d$$

where: L=length, V=water volume, and d=diameter. The service pressure may be from about 5000 psig (34 MPa) to about 6000 psig (41 MPa). The service pressure may also be about 5,400 psig (37 MPa) to about 5,600 psig (39 MPa). The cylinder may further include a gas transmission port for coupling to a pressure regulator assembly.

A self-contained breathing apparatus is also disclosed. The self-contained breathing apparatus may include a compressed gas cylinder comprising a pressure volume portion for containing a volume of gas pressurized to a service pressure. The pressure volume portion may have a length, a diameter, and a water volume selected according to the formula:

$$L = \frac{4\left(V - \frac{\pi d^3}{6}\right)}{\pi d^2} + d$$

where L=length, V=water volume, and d=diameter. The service pressure may be about 5,000 psig (34 MPa) to about 6,000 psig (41 MPa). Alternatively, the service pressure may be about 5,400 psig (37 MPa) to about 5,600 psig (39 MPa). The cylinder may further include a gas transmission port. The self-contained breathing apparatus may also include a first regulator valve coupled to the gas transmission port for receiving compressed gas from the pressure volume portion. The first regulator valve may be configured for reducing a pressure of gas received from the pressure volume portion to a second pressure that is lower than the first pressure. A second regulator valve may be provided in fluid communication with the first regulator valve for receiving compressed gas from the first regulator valve. The second regulator valve may be configured for reducing the pressure of gas received from the first regulator valve to a third pressure that is lower than the second pressure. A mask portion may also be provided. The mask portion may be in fluid communication with the second regulator valve for providing gas at the third pressure to a user. The self-contained breathing apparatus may further include a frame portion having a user support portion to enable a user to carry the compressed gas cylinder.

BRIEF DESCRIPTION OF THE DRAWINGS

By way of example, a specific embodiment of the disclosed device will now be described, with reference to the accompanying drawings, in which:

FIG. 3 is a table of exemplary comparative dimensional values of length, diameter, weight and mass for the disclosed air cylinders compared to conventional 4500 psi air cylinders, used to calculate relative rotational inertia values with respect to a typical user.

FIG. 10 is a table of exemplary comparative dimensional values of length, diameter and weight for an exemplary embodiment of the disclosed air cylinder compared to a conventional 4500 psig (31 MPa) air cylinder.

DETAILED DESCRIPTION

Figure 1A:
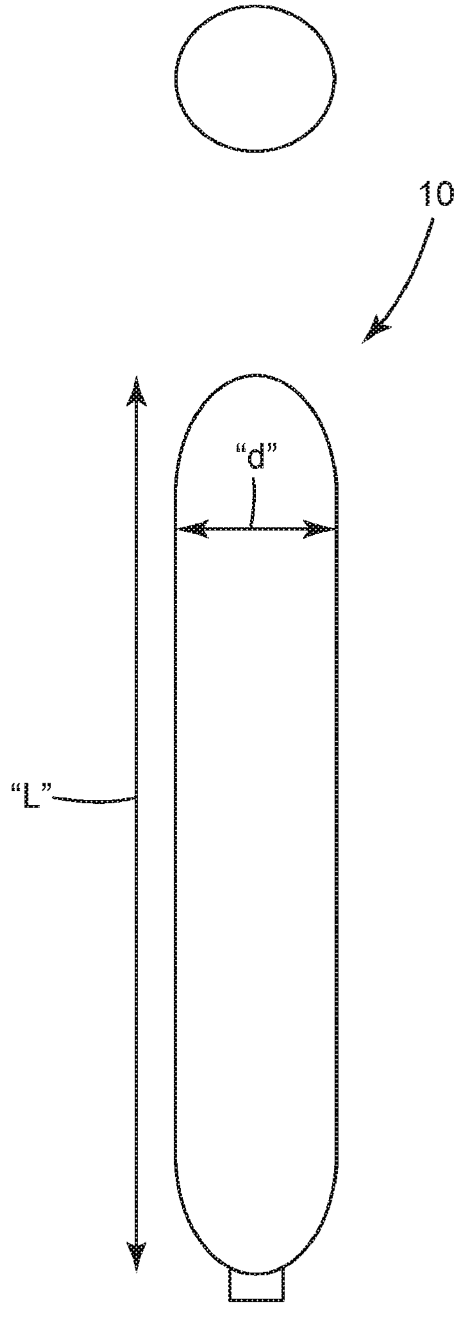
FIGS. 1A-1D, depict first, second, third and fourth embodiments of the disclosed air cylinder.
Figure 1B:
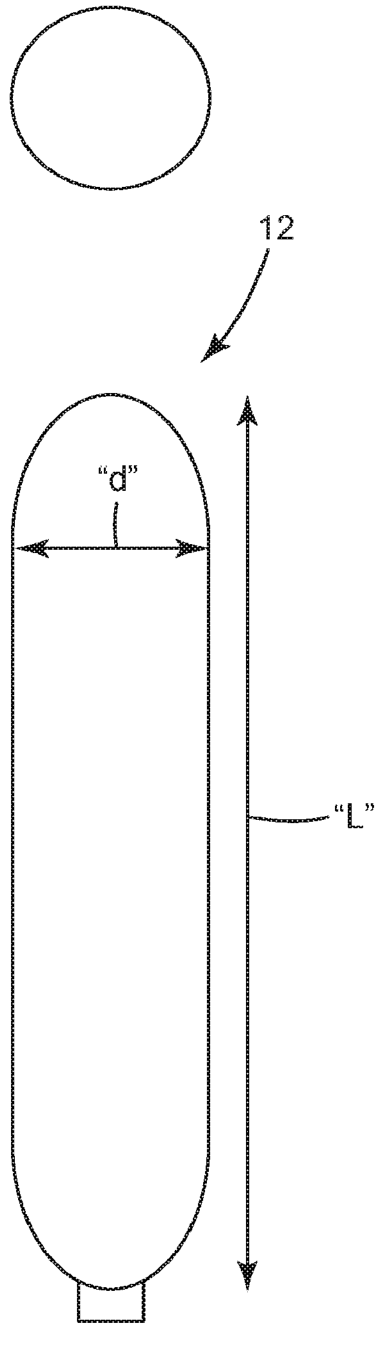
Figure 1C:
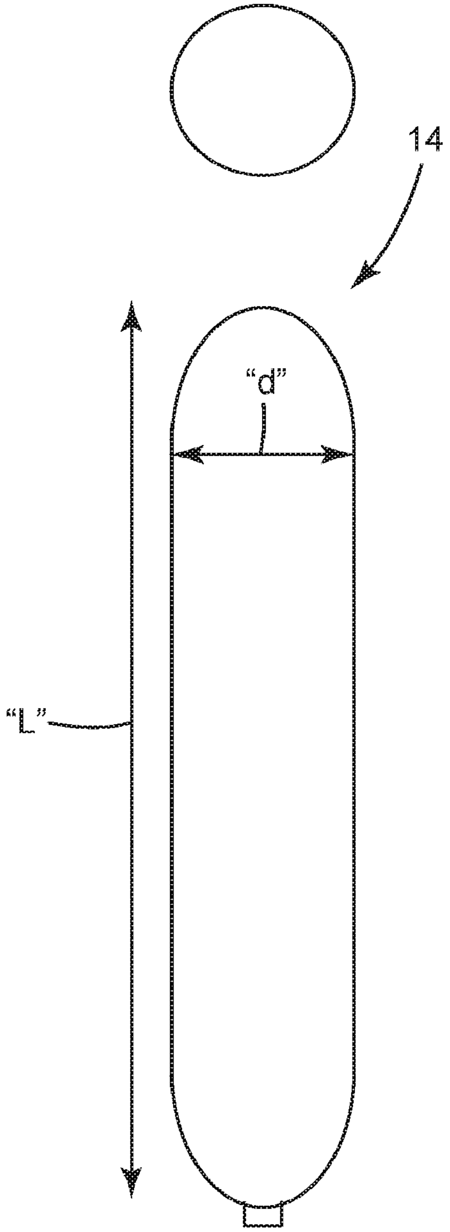
Figure 1D:
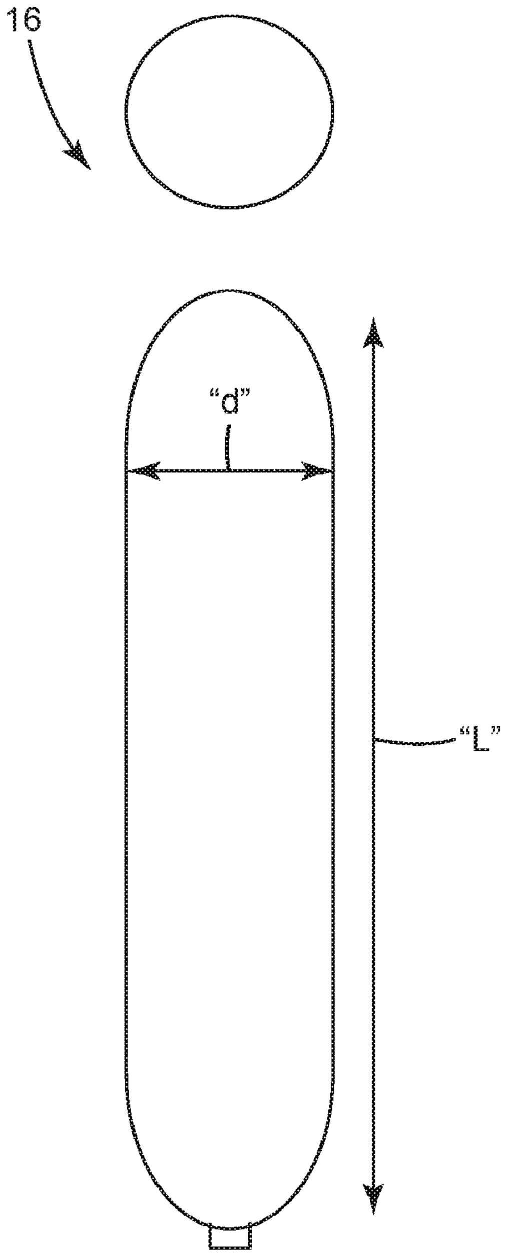

It is to be understood that the disclosed apparatus is not limited in its application to the details of construction and the arrangement of components set forth in the following description or illustrated in the following drawings. The disclosed apparatus is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of the figures.

Referring now to FIGS. 1A-1D, a plurality of air cylinders 10, 12, 14, 16 according to the disclosure are shown. The cylinders 10-16 are configured for use in a self-contained breathing apparatus (SCBA) used by firefighters, first responders, hazmat team members, rescuers and the like. Although the description will proceed in relation to use of the disclosed apparatus by firefighters, it will be appreciated that the disclosed cylinders are equally applicable to other uses.

Figure 2:
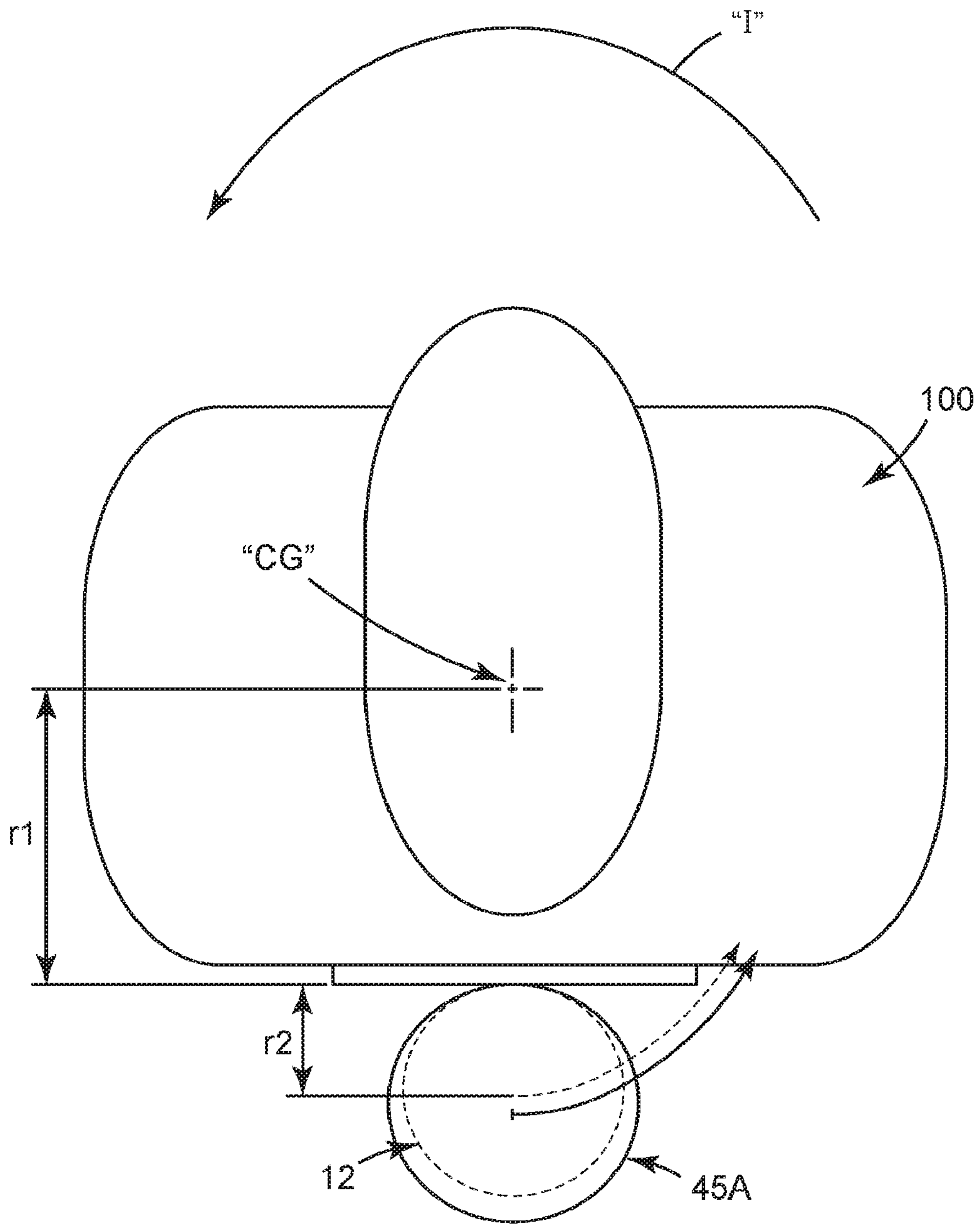
FIG. 2 is a cross-section view of an exemplary embodiment of the disclosed air cylinder and a conventional air cylinder positioned in relation to the center of gravity of a user.

As will be described in greater detail later, the air cylinders 10-16 are configured to have a reduced overall space envelope compared to traditional cylinders, while still maintaining desired standard breathable air volumes. As shown, each of the cylinders 10-16 has comprises a pressure volume portion having a length "L" and a diameter "d" which together define the overall space envelope of each cylinder. Traditional SCBA cylinders are configured to provide breathable air capacities in one of a variety of time increments (e.g., 30 minutes, 45 minutes, 60 minutes, and 75 minutes). It will be appreciated that these durations are based on a nominal air consumption rate of 40 liters per minute. To obtain free air volumes sufficient to provide breathable air according to these time increments, conventional SCBA cylinders are pressurized to about 4,500 psig (31 MPa). This pressurization scheme results in conventional cylinders having a particular length and diameter (depending upon the selected incremental free air capacity) which results in an overall conventional space envelope and weight. The disclosed air cylinders 10-16 provide the same air incremental capacities (30 minutes, 45 minutes, 60 minutes and 75 minutes, respectively) as conventional cylinders. The disclosed cylinders, however, have a reduced space envelope (e.g., length and/or diameter) and/or weight as compared to conventional cylinders. As will be appreciated, this reduced space envelope and/or weight of the SCBA results in an SCBA that is easier to maneuver and is less likely to become entangled with building structures and contents, as can commonly occur in confined spaces associated with firefighting operations. In addition, SCBAs incorporating the disclosed cylinders will be lighter than conventional air cylinders having corresponding free air volumes, thus enhancing portability and reducing weight stress on the firefighter. Further, by providing air cylinders having reduced diameters, the center of gravity of the SCBA resides closer to the firefighter's back, which further reduces operational stress. For example, FIG. 2 shows a comparison of a SCBA rotational inertia effect due to the location disclosed air cylinder 12, and conventional cylinder 45A, with respect to a user 100 (and more particularly their location with respect to the user's center of gravity "CG.") Twisting loads on an unaligned spine are greatest when a user is attempting to stop rotation of the waist/chest at the end of their rotational range of motion. An axial torque (τ) from above is required to stop the rotation and exerts a load on a twisted/unaligned spine since muscle contraction is typically at an angle with respect to the axis of rotation.

The axial torque, τ may be represented by the following formula:

$$\tau = \frac{I(\omega_2 - \omega_1)}{\Delta t}$$

where:

$\omega_2$=final angular velocity, $\omega_1$=initial angular velocity, $\Delta t$=time period of action, I=rotational inertia, where $$I=m(r_1+r_2)^2$$

where:

m=mass, $r_1$=distance between air cylinder edge and human center of gravity, and $r_2$=air cylinder radius, where $$r_2 = \frac{d_{cylinder}}{2}$$

and $d_{cylinder}$=air cylinder diameter

FIG. 3 is a table shows comparative values of cylinder water volume, cylinder weight, cylinder mass, air mass, r1 and r2 used to determine rotational inertia "I" for the disclosed cylinders 10, 12, 14, as well as for respective conventional 4500 psig (31 MPa) cylinders of the same free air volumes. The comparison assumes that "r1" (the distance between the user's CG to the edge of the cylinder) is 4 inches (10.16 centimeters). As can be seen, the rotational inertia of the disclosed cylinders 10, 12 and 14 is less than the rotational inertia of the respective conventional cylinders having of the same free air volumes. Specifically, for the disclosed 30 minute cylinder 10 a 16.4% reduction in rotational inertia results, for the disclosed 45 minute cylinder 12 an 11.1% reduction in rotational inertia results, and for the disclosed 60 minute cylinder 14 a 12.6% reduction in rotational inertia results.

Thus, the disclosed cylinders reduce rotational inertia effects while maintaining a desired free air capacity. As can be appreciated, by reducing the rotational inertia effect of the SCBA, the chances for early fatigue and possible injury are reduced. Moreover, by enabling the user to exert less energy in carrying and maneuvering the SCBA, the user may consume less air, and consequently increase his/her resident time in the emergency location.

In some embodiments, a priority may be placed on reducing the diameter "d" of the cylinder as much as practical, while maintaining a desired air capacity, in order to reduce the center of gravity of the SCBA and to increase maneuverability. Other embodiments may focus on reducing the length "L" or weight "W" of the cylinder, while still other embodiments may provide a blend of reduced dimensions "L," "d" and weight "W".

To obtain this reduced space and/or weight, the disclosed cylinders are configured to have a "service pressure" of from 5000 psig (34 MPa) to 6000 psig (41 MPa). In some embodiments, the disclosed cylinders have a service pressure of from 5400 psig (37 MPa) to 5600 psig (39 MPa). In other embodiments, the disclosed cylinders have a service pressure of from 5000 psig (34 MPa) to 5600 psig (39 MPa). In still other embodiments, the disclosed cylinders have a service pressure of from 5600 psig (39 MPa) to 6000 psig (41 MPa). In one particularly preferred embodiment, the disclosed cylinders have a service pressure of 5500 psig (38 MPa).

For the purposes of this disclosure, the term "service pressure" is as specified in 49 C.F.R. § 173.115, titled "Shippers—General Requirements for Shipments and Packagings," the entirety of which is incorporated by reference herein. Thus, the term "service pressure," shall mean the authorized pressure marking on the packaging to which the cylinder may be charged. For example, for a cylinder marked "DOT 3A1800", the service pressure is 12410 kPa (1800 psig).

As will be appreciated by one of ordinary skill in the art, during cylinder charging operations the service pressure of a particular cylinder may be exceeded by a slight amount (e.g., 10%). This slight overcharging may be purposeful, so as to compensate for heating generated as the air is compressed in the cylinder. Subsequent to charging, when the air in the charged cylinder returns to ambient temperature, the pressure in the cylinder drops slightly. Thus, to account for this pressure drop, the cylinder may be charged to a pressure slightly greater than the service pressure so that when the temperature of the air in the cylinder returns to ambient, the cylinder remains charged to a value at (or very near) the service pressure value. Thus, in one example, a cylinder having a service pressure of 1800 psig (12 MPa) may be charged to a pressure of about 1980 psig (14 MPa). For the disclosed cylinders 10-16, embodiments having a service pressure of 5500 psig (38 MPa) would be charged up to a value of about 6050 psig (42 MPa) to ensure that the cylinders 10-16 return to an internal pressure of about 5500 psig (38 MPa) when the temperature of the air in the cylinders returns to ambient. The disclosed design also enables the cylinders 10-16 to be compatible with existing charging infrastructure (i.e., compressors) that are generally capable of charging up to about 6000 psig (41 MPa).

Such infrastructure compatibility also includes size, weight, and structural limitations that currently exist for the conventional 4500 psig (31 MPa) air cylinder platform. Thus, the disclosed air cylinders 10-16 are compatible with existing air fill stations that utilize a container or fragmentation device to protect against a cylinder rupture. It is expected that the conventional infrastructure platform will be used to support the disclosed air cylinders 10-16.

In addition, fire trucks typically include jump seats where an SCBA, including an air cylinder, is held by retention clips in a seat to facilitate donning of the SCBA by a firefighter. The disclosed air cylinders 10-16 can be compatible with existing infrastructure for such jump seats. The disclosed cylinders 10-16 are also compatible with existing back frames utilized by firefighters to carry the SCBA. Further, the disclosed cylinders are compatible with existing storage tubes used in fire stations and fire trucks used to stow air cylinders.

Figure 4:
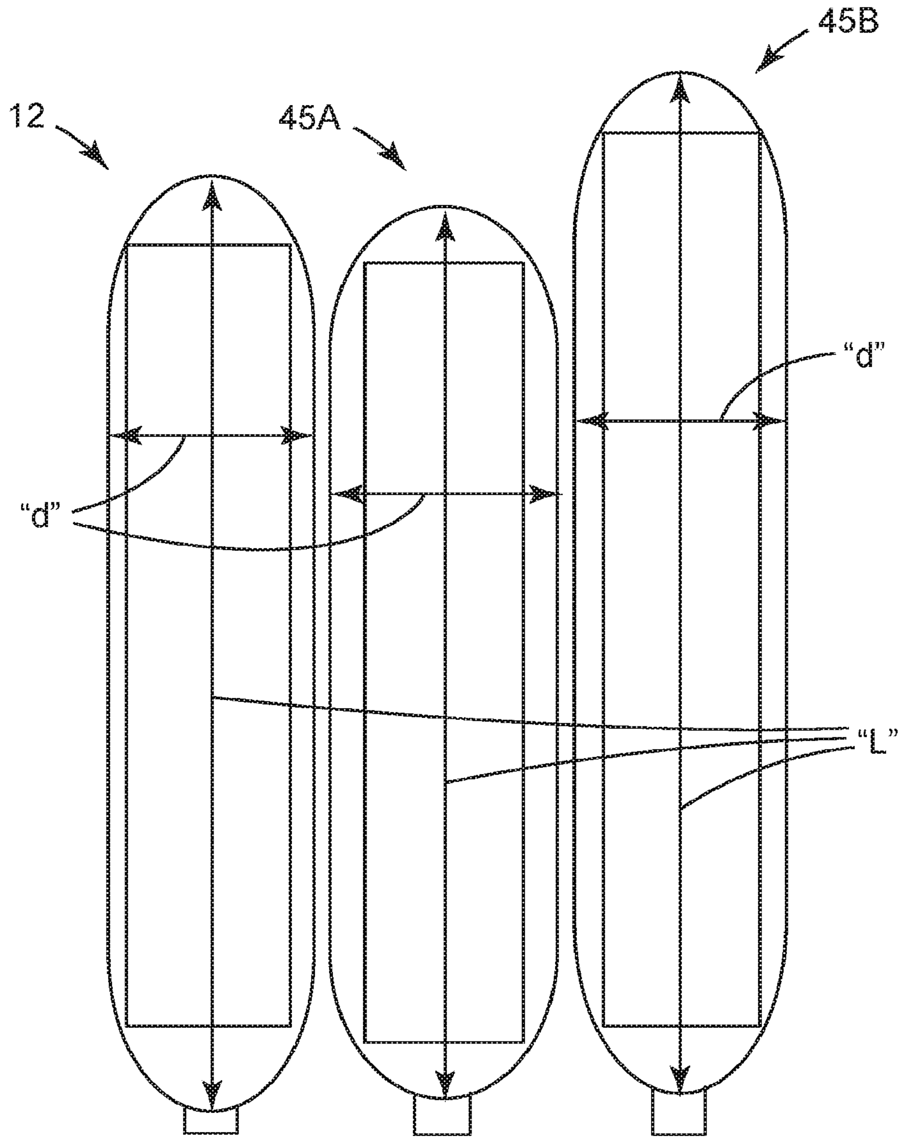
FIG. 4 is a schematic comparing the external dimensions of an exemplary embodiment of the disclosed air cylinder and a conventional 4500 psig (31 MPa) air cylinder.

Referring to FIG. 4, an exemplary qualitative comparison is shown between disclosed cylinder 12 (having a 45 minute capacity, or 1800 liter free air volume) and two traditional "45-minute" cylinders 45A and 45B. As can be seen, the disclosed cylinder 12 has an overall reduced space envelope as compared to that of the traditional cylinders 45A, 45B. As compared to traditional cylinder 45A, disclosed cylinder 12 has a slightly greater length "L," but is substantially smaller in diameter "d." Thus, cylinder 12 will not protrude as far away from the user's back during operation as compared to traditional cylinder 45A (see FIG. 2). As compared to traditional cylinder 45B, disclosed cylinder 12 has a substantially smaller length "L," while maintaining a similar diameter "d." Thus, cylinder 12 will not protrude as far above the user's back during operation as compared to traditional cylinder 45B. Due these reduced dimensions the disclosed 45-minute cylinder 12 is also substantially lighter than the traditional 45 minute cylinders 45A, 45B. Similar advantages are also obtained with disclosed cylinders 10, 14 and 16 as compared to their conventional 4500 psig (31 MPa) counterparts.

Thus, the inventors have discovered that the disclosed cylinders 10-16 provide an optimal combination of size, weight and air capacity for use in a SCBA while also being compatible with existing equipment infrastructure used in conjunction with air cylinders. The diameter, length and/or weight of the disclosed cylinders 10-16 is smaller than conventional air cylinders having corresponding 30, 45, 60 and 75 minute air capacities. As previously noted, this reduction in size is achieved by pressurizing the disclosed cylinders 10-16 to 5000-6000 psig (34 MPa-41 MPa), and in one exemplary embodiment about 5500 psig (38 MPa), which results in reduced size and weight relative to conventional air cylinders which are pressurized to 4500 psig (31 MPa).

It is noted that although it is possible to design air cylinders capable of being pressurized to far greater pressures than the 5000-6000 psig (34 MPa-41 MPa) of the disclosed cylinders, the resulting cylinders would include undesirable increases in overall weight of the cylinder (due to substantially increased wall thicknesses) without a proportionally advantageous capacity increase or size decrease. Thus, it has been discovered that 5500 psig (38 MPa) provides an optimal combination of size, weight and additional air capacity for an air cylinder for use in a firefighting environment while also maintaining compatibility with existing charging infrastructure. This can be seen in relation to FIG. 5, which is a plot of pressure vs. cylinder internal volume. This exemplary plot shows a curve for a 45 minute (i.e., 1800 liters of free air) cylinder. As can be seen, a traditional 45 minute cylinder must have an internal volume of about 418 cubic inches in order to contain 1800 liters of free air when charged to 4500 psig (31 MPa). By changing the charging pressure to 5500 psig (38 MPa) cylinder internal volume can be decreased by about 69 cubic inches, or 17%, while maintaining the desired 1800 liter free volume. By decreasing the cylinder volume by 17%, a proportional reduction in cylinder external dimensions can be achieved (see, e.g., FIG. 4). In one exemplary embodiment, the disclosed 45-minute cylinder 12, charged to about 5500 psig (38 MPa), can have the same external dimensions as a traditional 30-minute cylinder pressurized to 4500 psig (31 MPa).

As previously noted, the inventors have found that simply continuing to increase the charging pressure (e.g., 6,000 psig (41 MPa) and beyond) does not result in commensurate savings in space and weight. This can be seen in FIG. 6, which shows that to obtain an additional 69 cubic inch (17%) decrease in cylinder volume (over that obtained with a 5500 psig (38 MPa) charging pressure), would require a cylinder charging pressure of about 7,250 psig (50 MPa) (about a 32% increase in charging pressure). This is shown for each of the disclosed cylinders 10, 12, 14 in FIG. 10 (to be discussed in greater detail later). What can be seen from this data is that increases in cylinder charging pressure beyond 6,000 psig (41 MPa) result in continuing decreases in charging efficiency (i.e., additional decreases in cylinder volume require substantial increases in charging pressure). In addition, increasing charging pressures beyond 6000 psig (41 MPa) also results in substantial undesirable increases in weight due to the large wall thicknesses required to contain such higher pressures.

Figure 5:
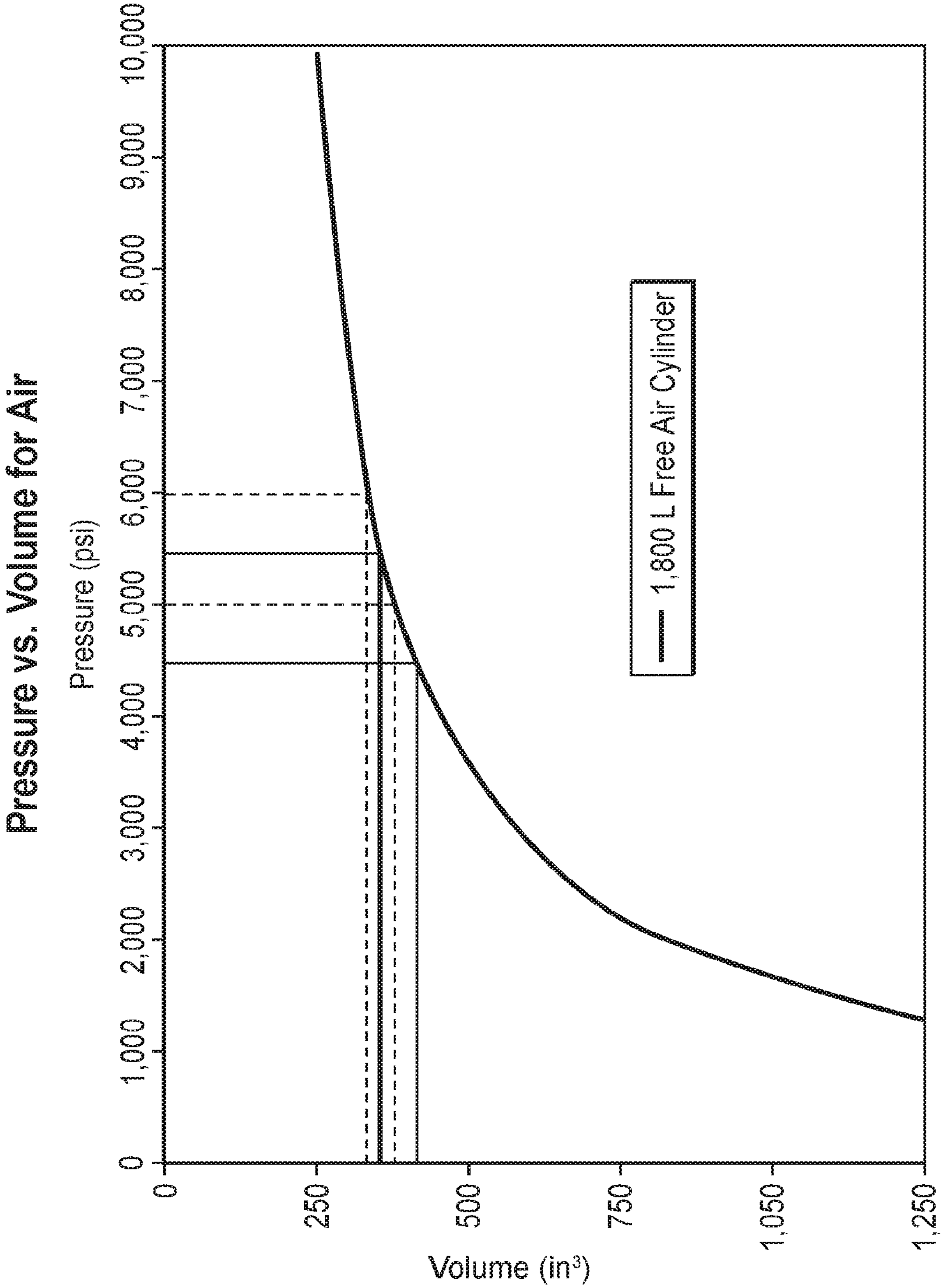
FIG. 5 is a plot of pressure vs. cylinder internal volume for an exemplary embodiment of the disclosed air cylinder.
Figure 6:
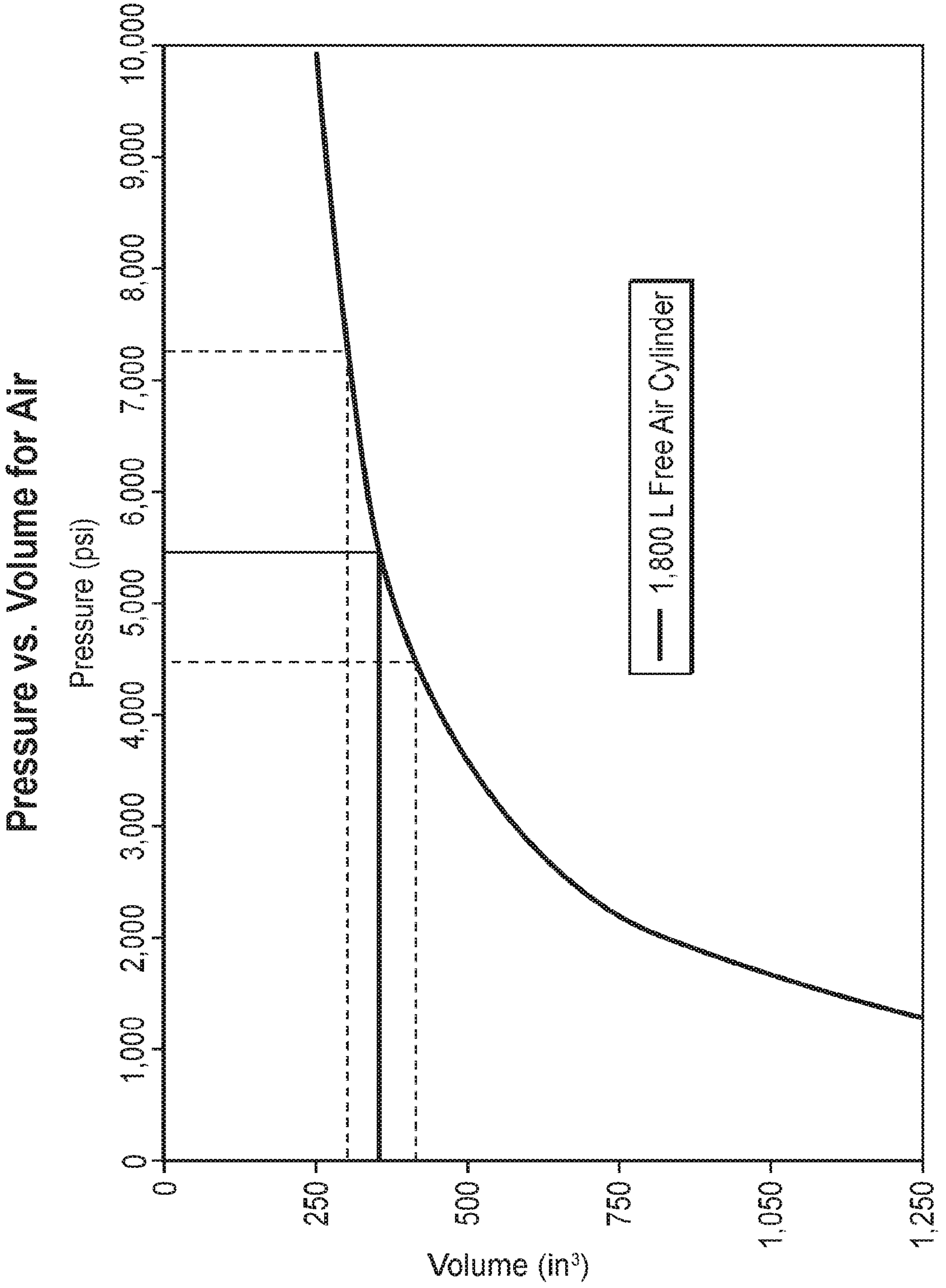
FIG. 6 is a second exemplary plot of pressure vs. cylinder internal volume for an exemplary embodiment of the disclosed air cylinder.
Figure 7:
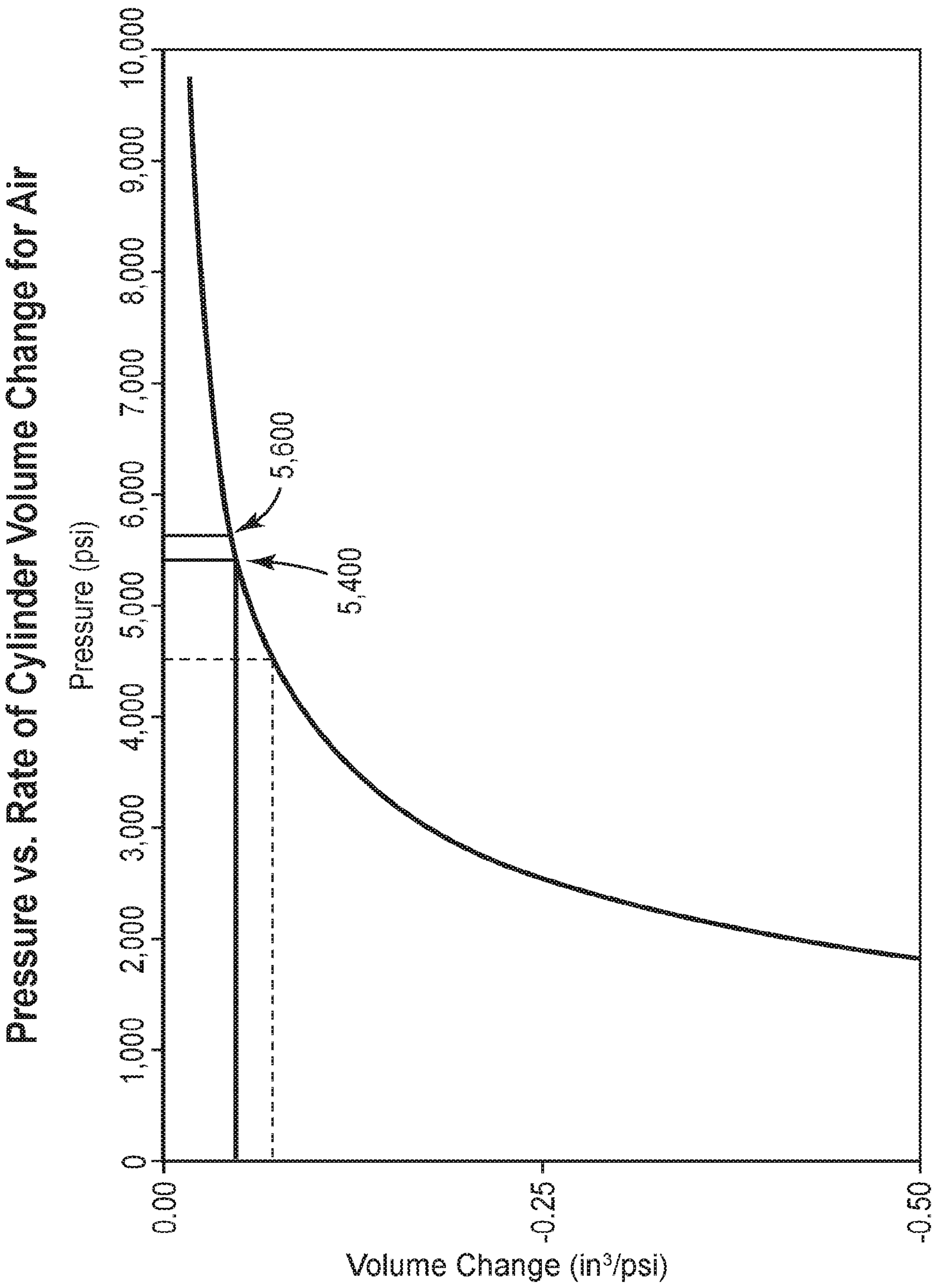
FIG. 7 is a plot of the first derivative of pressure vs. cylinder internal volume for an exemplary embodiment of the disclosed air cylinder.

FIG. 7 is a plot of the first derivative of the plots of FIGS. 5 and 6, illustrating the rate of change of volume (cubic inches/psi) as a function of charging pressure. This plot further illustrates how the curve begins to substantially flatten at about 6000 psig (41 MPa), which supports the proposition that charging a cylinder above about 6000 psig (41 MPa) results in a substantially decreased return in terms of cylinder volume, and thus size, reduction.

It will be appreciated that although the plots of FIGS. 5-7 provide specific values relating to an 1800 liter (i.e., 45 minute) cylinder, that similar results are obtained for cylinders of other sizes (i.e., 30 minutes, 60 minutes and 75 minutes). In addition, it will be appreciated that the disclosed cylinders need not be provided in the aforementioned discrete capacities, but could instead be provided in a wide variety of other incremental capacities, as desired (e.g., 35 minutes, 50 minutes, 62 minutes, etc.)

Figure 8:
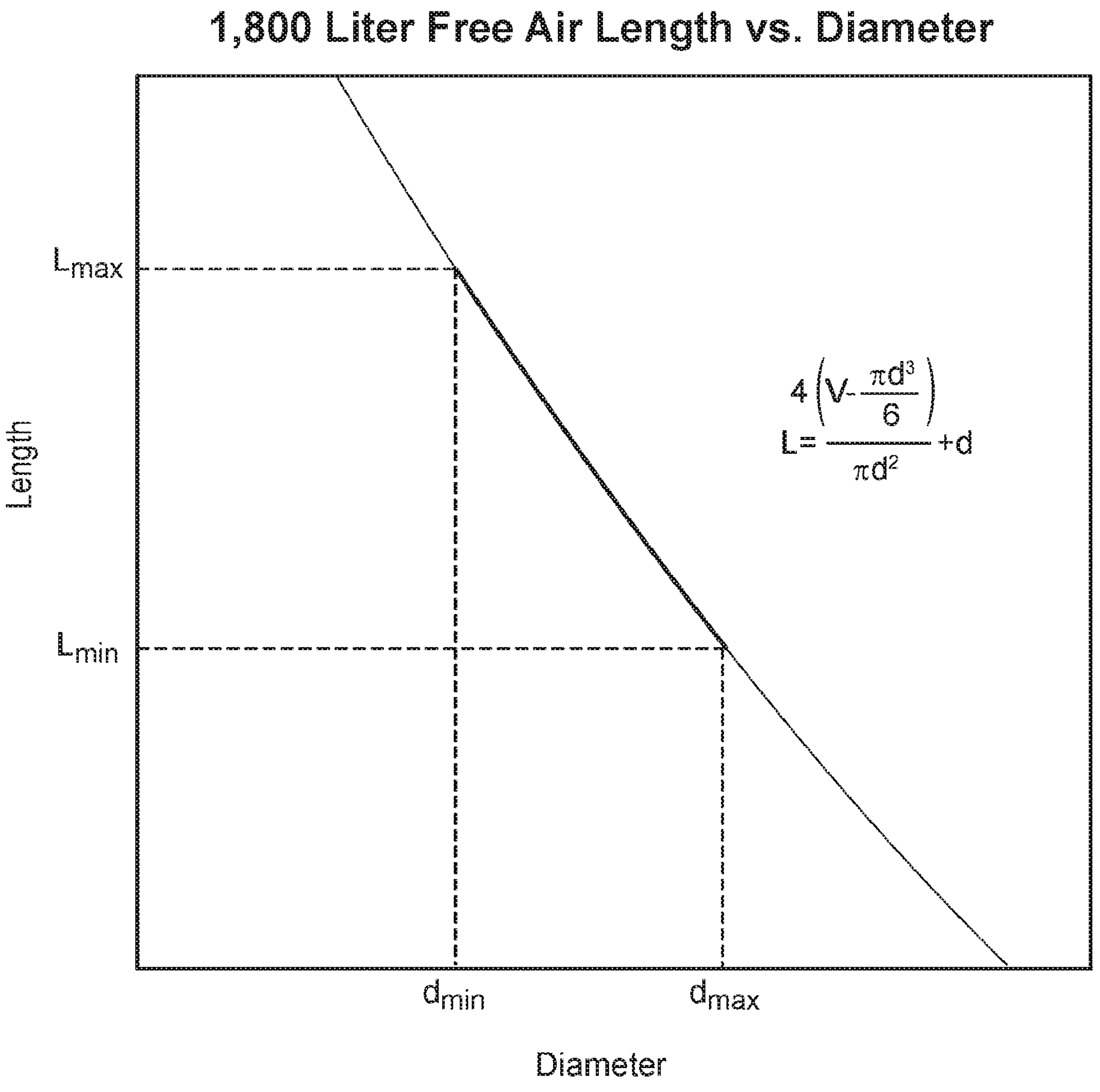
FIG. 8 is a plot of cylinder length vs. cylinder diameter for an exemplary embodiment of the disclosed air cylinder.

Referring now to FIG. 8, an exemplary plot of cylinder length (L) vs. diameter (d) is shown for the disclosed cylinders 10-16. Although the specific values illustrated in FIG. 6 relate to a 45 minute cylinder (1800 liter free air volume), the formula is applicable to 30 minute, 60 minute and 75 minute cylinders as well. The plot indicates that desired cylinder size and weight reductions can be obtained in cylinders 12-16 by selecting length or diameter based on the following equation:

$$L = \frac{4\left(V - \frac{\pi d^3}{6}\right)}{\pi d^2} + d \qquad (1)$$

where:
L=length
V=cylinder water volume, and
d=diameter.

It will be appreciated that "water volume" as used in the above formula refers to the interior physical volume of the associated cylinder 10-16, and not the compressed "free air" volume of the cylinder. Likewise, it will be appreciated that the values of Lmax, Lmin, dmax and dmin (as well as the resulting selected "L" and "d" represent the internal dimensions of the pressure volume portion of the cylinder 12. As noted, the curve of FIG. 8 is represented by Equation (1), as bounded by values of Lmax, Lmin, dmax and dmin, and thus, the disclosed cylinder 12 may have a length "L" and a diameter "d" that fall on the curve between Lmax/dmin and Lmin/dmax. Using the curve and formula, the dimensions of cylinder 12 can be obtained to result in a cylinder that, when charged to 5500 psig (38 MPa), contains a free air volume of about 1800 liters (i.e., a 45 minute supply of breathable air). It will be appreciated that Equation (1) applies to a cylinder having hemispherical heads (i.e., ends). Thus, if the cylinder includes square, ellipsoidal, or torispherical heads, then different Lmin/Lmax and dmin/dmax values may apply than those noted herein.

In one exemplary embodiment, applicable to a 45 minute cylinder (i.e., second cylinder 12), Lmax may be about 19.5 inches, Lmin may be about 16.9 inches, dmax may be about 5.4 inches, and dmin may be about 5.0 inches, where Lmax, Lmin, dmax and dmin represent the internal dimensions of the pressure volume portion of the cylinder 12. In one exemplary embodiment, Lmax and dmax are defined as the Length and Diameter of a conventional (i.e., 4500 psig (31 MPa)) 45 minute cylinder. The disclosed cylinder 12 may be selected to have a length equal to Lmax, which according to Equation (1) and FIG. 8, would result in a diameter equal to dmin. The resulting cylinder 12 would have a diameter smaller than that of the traditional 45 minute cylinder. Alternatively, the disclosed cylinder 12 may be selected to have a diameter equal to dmax, which according to Equation (1) and FIG. 8 would result in a length equal to Lmin. The resulting cylinder 12 would have a length smaller than that of the traditional 45 minute cylinder. Various other embodiments are contemplated in which the length and diameter of the disclosed cylinder 12 would be at a point on the curve between some combination of Lmax, Lmin, dmax and dmin.

By selecting the length and diameter of the cylinders 10-16 according to Equation (1), weight reductions of from about five percent (5%) to about twelve percent (12%) or more may be achieved with the disclosed cylinders 10-16 as compared to standard 4500 psig (31 MPa) air cylinders (see FIG. 10).

Figure 9:
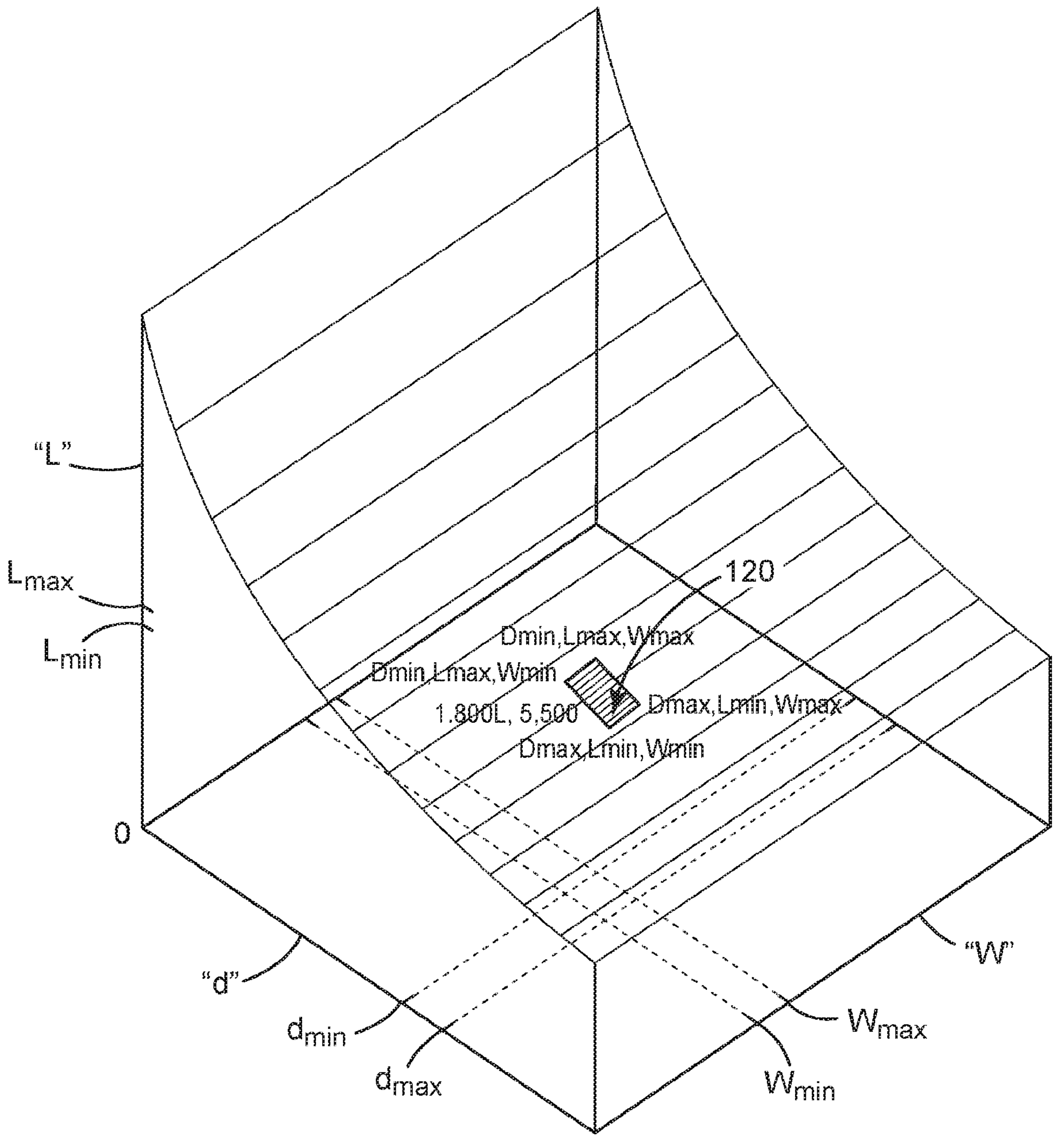
FIG. 9 is a three dimensional plot of cylinder length vs. cylinder diameter vs.
cylinder weight for an exemplary embodiment of the disclosed air cylinder.

FIG. 9 is an exemplary 3-dimensional plot of cylinder length vs. cylinder diameter vs. cylinder weight for an exemplary 45 minute (1800 liter) cylinder 12 charged to 5500 psig (38 MPa). As previously noted, the values of cylinder diameter and cylinder length represent the internal dimensions of the pressure volume portion of the cylinder 12. As with the curve of FIG. 8, the illustrated 3-dimensional surface of FIG. 9 may enable the selection of an appropriate cylinder depending on particularly selected maximum and minimum values of length, diameter and weight. Thus, the disclosed cylinder 12 may have a Length "L," a diameter "d" and a weight "W" that fall within the surface within the area bounded by the points dmin, Lmax, Wmax; dmin, Lmax, Wmin; dmax, Lmin, Wmin; and dmax, Lmin, Wmax. An exemplary point 120 is shown within this area in FIG. 8 illustrating an appropriate combination of length, diameter and weight. In one embodiment, "Wmax" is no greater than the weight of a conventional 4500 psig (31 MPa) cylinder having the same air capacity.

Using the surface of FIG. 9, the dimensions of cylinder 12 can be obtained to result in a cylinder that, when charged to 5500 psig (38 MPa), contains a free air volume of about 1800 liters (i.e., a 45 minute supply of breathable air).

FIG. 10 is a chart showing comparative values of "water volume," "length," "diameter," "radius," "length," and "weight" for 30, 45 and 60 minute cylinders. It should be noted that the weight (W, Wmax, Wmin) values of the disclosed cylinders 10-16 were computed using assumed wall thicknesses of about 0.322 inches (0.818 cm) for the disclosed 30 minute cylinder 10, about 0.337 inches (0.866 cm) for the disclosed 45 minute cylinder 12, about 0.362 inches (0.919 cm) for the disclosed 60 minute cylinder, and about 0.398 inches (1.01 cm) for the disclosed 75 minute cylinder 16. The weight values of the 4500 psig (31 MPa) cylinders were computed using assumed wall thicknesses of about of about 0.263 inches (0.668) for a conventional 4500 psig (31 MPa) 30 minute cylinder, 0.317 inches (0.805 cm) for a conventional 4500 psig (31 MPa) 45 minute cylinder, and 0.351 inches (0.892 cm) for a conventional 4500 psig (31 MPa) 60 minute air cylinder. These wall thicknesses may include the combination of an inner liner, a shell, and any other layers which may be employed in constructing cylinders of this type.

As can be seen, water volume decreases associated with each of the disclosed cylinders 10, 12, 14 result in substantial weight decreases as compared to corresponding conventional air cylinders of similar free air capacities. Thus, any weight added to the disclosed cylinders 10-16 as a result of the reinforcement required to accommodate the higher pressures (as compared to conventional 4500 psig (31 MPa) cylinders) still results in cylinders that weigh less than the corresponding conventional cylinders. Substantial length and/or diameter reductions are also illustrated.

FIG. 10 also includes a tabulation of "compressed volume change," both in cubic inches reduced and as a percentage reduction, for various embodiments of the disclosed cylinders 10, 12, 14 charged to different service pressures (e.g., 5000 psig (34 MPa), 5500 psig (38 MPa), 6000 psig (41 MPa)). As previously noted, this data shows that the disclosed cylinders provide a desirable balance between cylinder internal volume reduction, external dimensional reduction, weight reduction, and charging pressure. The data show that simply continuing to increase charging pressure above about 6,000 psig (41 MPa) results in undesirably decreased charging efficiency.

Further, for specific embodiments of 30 minute (1200 liter), a 45 minute (1800 liter), a 60 (2400 liter) and a 75 minute (3000 liter) cylinders 10, 12, 14 and 16, specific exemplary Lmax, Lmin, Dmax, Dmin, Wmax and Wmin values are provided. The Lmax, Lmin, Dmax and Dmin values represent the internal dimensions of the pressure volume portion of the respective cylinders 10-16. As previously discussed, by providing a range of desirable length, diameter and weight values, a particular cylinder can be designed that includes a desired free air volume, a desired weight and a desired external space envelope. In some embodiments, it may be desirable to minimize weight. In such cases, the Wmin value can be selected as the value for weight, and the length and diameter values can be to remain within Lmin/Lmax, dmin/dmax in accordance with Equation (1).

In other embodiments, it may be desirable to minimize diameter (e.g., to reduce the rotational intertia effect). In such cases, the dmin value can be selected as the diameter, and the length and weight values can be adjusted to remain within Lmin/Lmax, Wmin/Wmax in accordance with Equation (1). It will be appreciated that Equation (1) applies to a cylinder having hemispherical heads (i.e., ends). Thus, if the cylinder includes square, ellipsoidal, or torispherical heads, then different Lmin/Lmax and dmin/dmax values may apply than those noted in FIG. 10.

Figure 11:
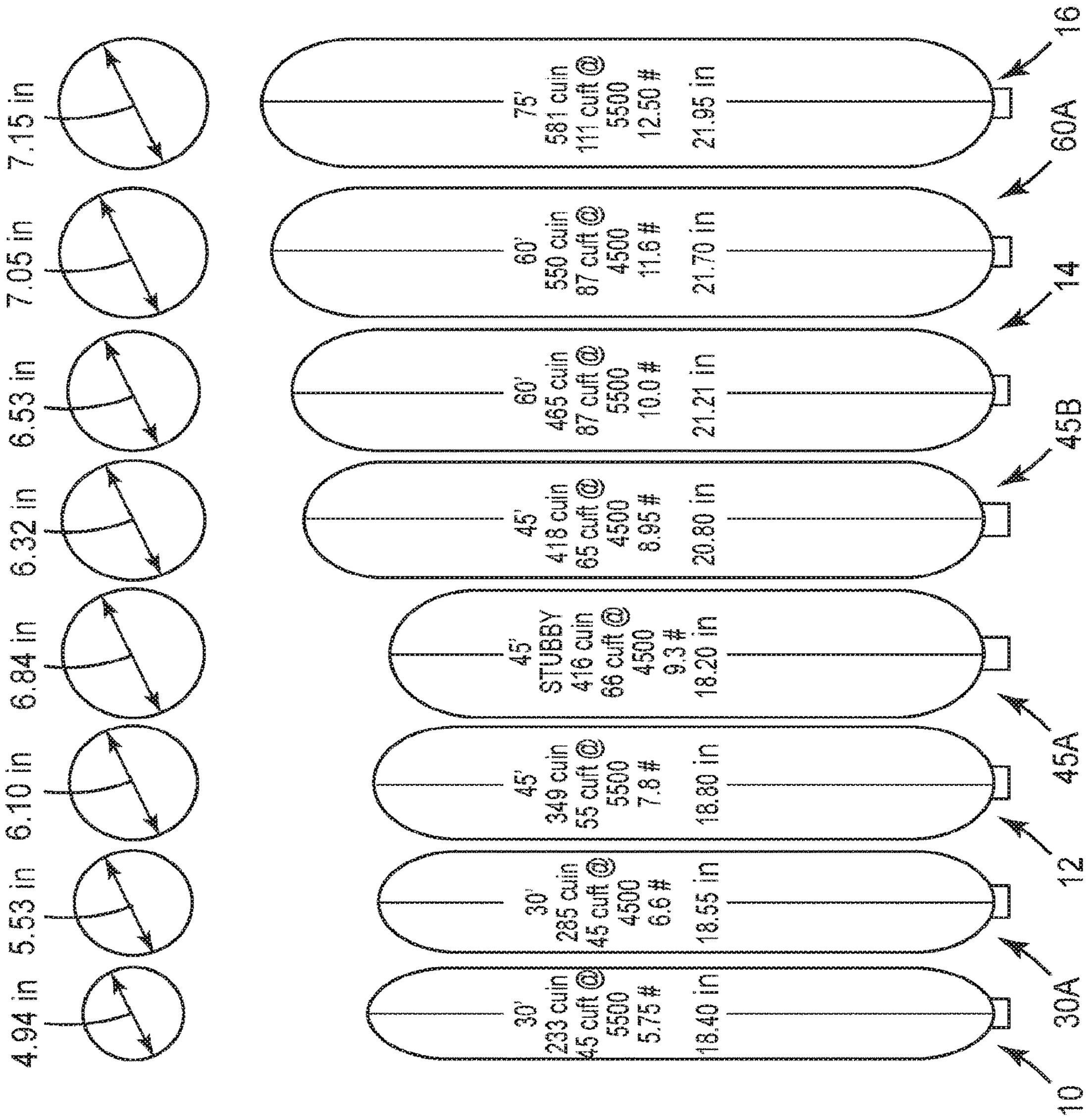
FIG. 11 is a comparison of several exemplary embodiments of the disclosed air cylinder compared to corresponding conventional 4500 psig (31 MPa) air cylinders.

An exemplary side-by-side comparison of the dimensions of the disclosed cylinders 10-16 as compared to traditional 4500 psig (31 MPa) cylinders is shown in FIG. 11.

Example 1-30 Minute Air Cylinder Comparison

A conventional 30 minute air cylinder 30A was manufactured with a service pressure of 4500 psig (31 MPa). The conventional air cylinder 30A had a weight of 6.6 lbs (2.99 kg), an external length of 18.55 inches (47.12 cm) and an outside diameter of 5.53 inches (14.05 cm). A 30 minute air cylinder 10 according to the disclosure was manufactured with a service pressure of 5500 psig (38 MPa). The air cylinder 10 had a weight of 5.8 lbs (2.63 kg), an external length of 18.9 inches (48.00 cm) and an outside diameter of 4.94 inch (12.55).

Example 2-45 Minute Air Cylinder Comparison

A conventional 45 minute air cylinder 45A was manufactured with a service pressure of 4500 psig (31 MPa). The conventional cylinder 45A had a weight of 9.0 lbs (4.08 kg), an external length of 18.20 inches (46.23 centimeters) and diameter of 6.84 inches (17.37 centimeters). A second conventional air cylinder 45B was manufactured with an external length of 20.80 inches (52.83 cm) and an outside diameter of 6.32 inches (16.05 cm). A 45 minute air cylinder 12 according to the disclosure was manufactured with a service pressure of 5500 psig (38 MPa). The air cylinder 12 had a weight of 7.8 lbs (3.54 kg), an external length of 18.8 inches (47.75 cm) and an outside diameter of 6.10 inches (15.49 cm).

Example 3-60 Minute Air Cylinder Comparison

A conventional 60 minute air cylinder 60A was manufactured with a service pressure of 4500 psig (31 MPa). The conventional cylinder 60A had a weight of 11.6 lbs (5.26 kg), an external length of 21.70 inches (55.12 cm) and an outside diameter of 7.05 inches (17.91 cm). A 60 minute air cylinder 14 according to the disclosure was manufactured with a service pressure of 5500 psig (38 MPa). The 60 min cylinder 14 had a weight of 10.0 lbs (4.54 kg), an external length of 21.21 inches (53.87 cm), and an outside diameter of 6.53 inches (16.59 cm).

Example 4-75 Minute Air Cylinder Comparison

Conventional 75 minute air cylinders (4500 psig (31 MPa) service pressure) were not manufactured because the required length and diameter dimensions were considered to be excessive for SCBA applications. A 75 minute air cylinder 16 according to the disclosure was manufactured with a service pressure of 5500 psig (38 MPa). The 75 min cylinder had a weight of 12.5 lbs (5.67 kg), an external length of 21.95 inches (55.75 cm), and an outside diameter of 7.15 inches (18.16 cm). Although comparative data does not exist for conventional 75 minute cylinders, the disclosed 75 minute cylinder 16 can be seen to compare well with the conventional 60 minute cylinder (4500 psig (31 MPa) service pressure) in both diameter and length.

The disclosed cylinders 10-16 can be manufactured using any of a variety of materials, including aluminum, steel, carbon fiber and/or fiberglass wrapped aluminum or steel, and the like. In addition, other composite materials can also be used.

Thus dimensioned, the disclosed air cylinders may provide a user with increased maneuverability, longer air supply duration, lower center of gravity (for shorter cylinders), a center of gravity placed closer to the user's back (for cylinders having smaller diameters). Ultimately, the disclosed cylinders can provide a user with greater comfort and mobility in a confined space.

Figure 12:
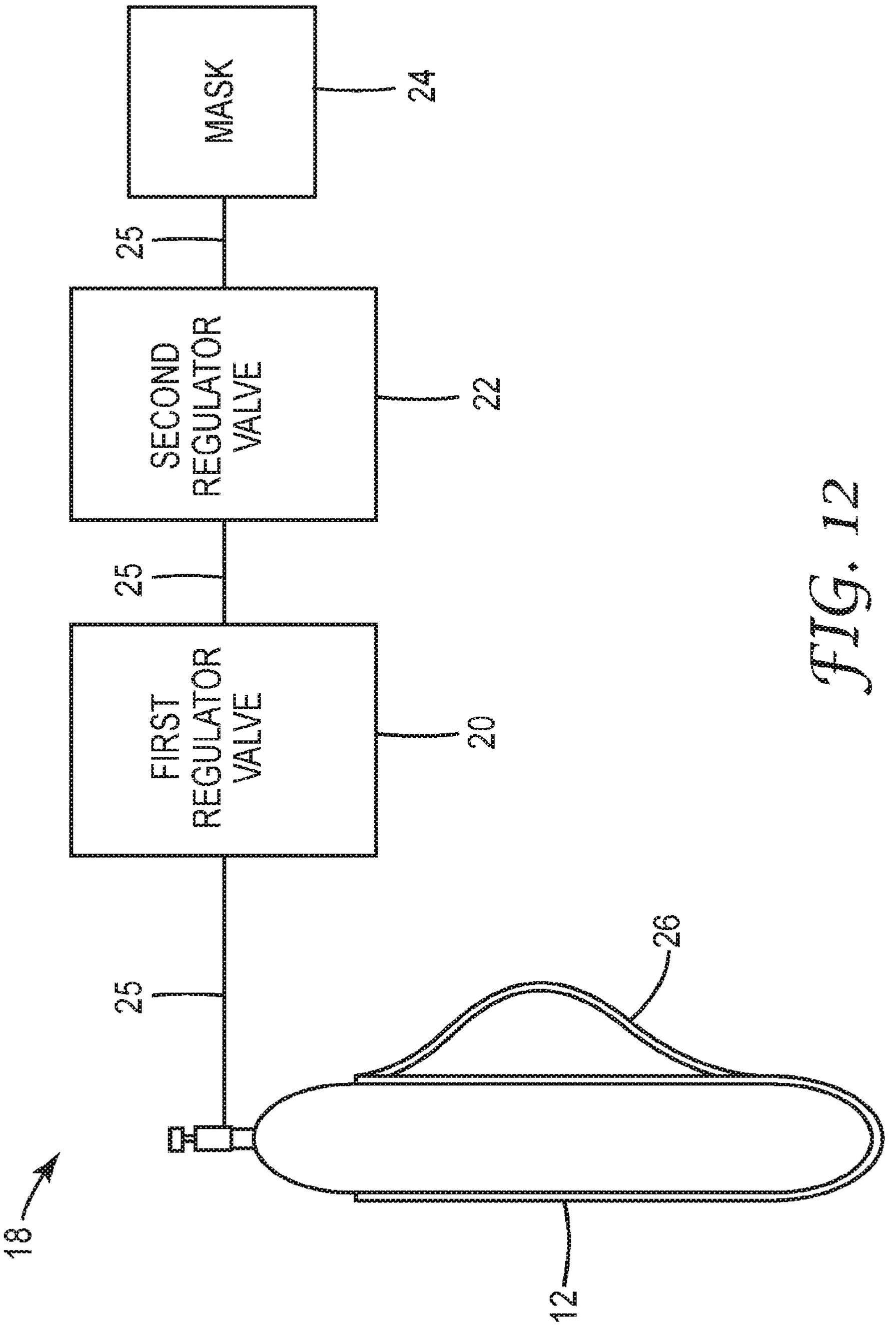
FIG. 12 is a schematic of a self-contained breathing apparatus for use with the disclosed air cylinders of FIGS. 1A-1D.

Referring now to FIG. 12, a schematic of an exemplary SCBA 18 includes a single air cylinder 12 which is mounted to a harness or frame 26 to enable the air cylinder 12 to be carried on the firefighter's back. The air cylinder 12 is connected to a first regulator valve 20, which in turn is connected to a second regulator valve 22. The second regulator valve 22 is connected to a mask 24 that can be worn by a firefighter. The air cylinder 12, first regulator valve 20, second regulator valve 22 and mask 24 are in fluid communication with each other via one or more hoses 25.

The first regulator valve 20 reduces air pressure from the air cylinder 12 to a predetermined level. The second regulator valve 22 provides a regulated flow of air to the firefighter at very low pressure below the predetermined level via the mask 24. The second regulator valve 22 operates in either a demand mode, in which the second regulator valve 22 is activated only when the firefighter inhales, or in a continuous positive mode, wherein the second regulator valve 22 provides constant airflow to the mask 24.

It will be appreciated that any of the disclosed air cylinders 10-16 could be used with the above described SCBA 18. It will also be appreciated that the disclosed arrangement advantageously allows an SCBA to employ a single air cylinder having a desired free air capacity, while also reducing an overall space envelope and weight as compared to conventional (i.e., 4500 psig (31 MPa)) air cylinders having similar free air capacities.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A compressed gas cylinder for a self-contained breathing apparatus, the cylinder including a pressure volume portion for containing a volume of gas pressurized to a service pressure of between about 5,000 psig and about 6,000 psig, the pressure volume portion having a length, a diameter, and a water volume;

wherein the pressure volume portion defines an operational parameter of the cylinder, the operational parameter being a relationship between free air capacity of the cylinder in liters and a rated service time in minutes, the operational parameter comprising one of: 1200 liters of free gas and 30 minutes of rated service time; 1800 liters of free gas and 45 minutes of rated service time; 2400 liters of free gas and 60 minutes of rated service time; and 3000 liters of free gas and 75 minutes of rated service time;

wherein at least one of the length and the diameter of the pressure volume portion is at least slightly less than at least one of a corresponding length and diameter of a compressed gas cylinder for a self-contained breathing apparatus having a service pressure of about 4500 psig; and wherein the length and diameter of the pressure volume portion provide a weight reduction of from about 5% to about 12% as compared to a compressed gas cylinder for a self-contained breathing apparatus having a service pressure of about 4500 psig.

2. The compressed gas cylinder of claim 1, wherein the compressed gas cylinder has a radius of 3.27 inches or less to minimize rotational inertia on a user.

3. The compressed gas cylinder of claim 1, wherein the pressure volume portion provides a rotational inertia effect to the user that is substantially less than a rotational inertia effect than a compressed gas cylinder for a self-contained breathing apparatus having a service pressure of about 4500 psig.

4. The compressed gas cylinder of claim 1, wherein the weight of the pressure volume portion is substantially less than a weight of a compressed gas cylinder for a self-contained breathing apparatus having a service pressure of about 4500 psig.

5. The compressed gas cylinder of claim 1, wherein for the operational parameter comprising one of: 1200 liters of free gas and 30 minutes of rated service time, the length of the pressure volume portion is no greater than about 17.3 inches; 1800 liters of free gas and 45 minutes of rated service time, the length of the pressure volume portion is no greater than about 19.5 inches; 2400 liters of free gas and 60 minutes of rated service time, the length of the pressure volume portion is no greater than about 20.3 inches; and 3000 liters of free gas and 75 minutes of rated service time, the length of the pressure volume portion is no greater than about 21.0 inches.

6. The compressed gas cylinder of claim 1, wherein for the operational parameter comprising one of: 1200 liters of free gas and 30 minutes of rated service time, the diameter of the pressure volume portion is no greater than about 4.7 inches; 1800 liters of free gas and 45 minutes of rated service time, the diameter of the pressure volume portion is no greater than about 5.4 inches; 2400 liters of free gas and 60 minutes of rated service time, the diameter of the pressure volume portion is no greater than about 6.1 inches; and 3000 liters of free gas and 75 minutes of rated service time, the diameter of the pressure volume portion is no greater than about 6.8 inches.

7. The compressed gas cylinder of claim 1, wherein for the operational parameter comprising one of: 1200 liters of free gas and 30 minutes of rated service time, the weight of the pressure volume portion is no greater than about 6.6 pounds; 1800 liters of free gas and 45 minutes of rated service time, the weight of the pressure volume portion is no greater than about 9.0 pounds; 2400 liters of free gas and 60 minutes of rated service time, the weight of the pressure volume portion is no greater than about 11.6 pounds; and 3000 liters of free gas and 75 minutes of rated service time, the weight of the pressure volume portion is no greater than about 12.5 pounds.

8. The compressed gas cylinder of claim 1, wherein the service pressure is between about 5,400 psig and about 6,000 psig.

9. The compressed gas cylinder of claim 1, wherein the service pressure is between about 5,000 psig and about 5,600 psig.

10. The compressed gas cylinder of claim 1, wherein the service pressure is between about 5,600 psig and about 6000 psig.

11. The compressed gas cylinder of claim 1, wherein the service pressure is about 5500 psig.

12. The compressed gas cylinder of claim 1, wherein the pressure volume portion is constructed using at least one of aluminum, steel, carbon fiber, and fiberglass wrapped aluminum or steel.

13. A compressed gas cylinder for a self-contained breathing apparatus, the cylinder including a pressure volume portion for containing a volume of gas pressurized to a service pressure of between about 5,000 psig and about 6,000 psig, the pressure volume portion having a length, a diameter, a wall thickness, and a water volume;

wherein the pressure volume portion defines an operational parameter of the cylinder, the operational parameter being a relationship between free air capacity of the cylinder in liters and a rated service time in minutes, the operational parameter comprising one of: 1200 liters of free gas and 30 minutes of rated service time; 1800 liters of free gas and 45 minutes of rated service time; 2400 liters of free gas and 60 minutes of rated service time; and 3000 liters of free gas and 75 minutes of rated service time;

wherein for the operational parameter comprising one of: 1200 liters of free gas and 30 minutes of rated service time, the wall thickness is about 0.322 inches; 1800 liters of free gas and 45 minutes of rated service time, the wall thickness is about 0.337 inches; 2400 liters of free gas and 60 minutes of rated service time, the wall thickness is about 0.362 inches; and 3000 liters of free gas and 75 minutes of rated service time, the wall thickness is about 0.398 inches; and wherein for the operational parameter comprising one of: 1200 liters of free gas and 30 minutes of rated service time, the weight of the pressure volume portion is between about 5.7 pounds and about 6.6 pounds; 1800 liters of free gas and 45 minutes of rated service time, the weight of the pressure volume portion is between about 7.8 pounds and about 9.0 pounds; 2400 liters of free gas and 60 minutes of rated service time, the weight of the pressure volume portion is between 10.0 pounds and about 11.6 pounds; and 3000 liters of free gas and 75 minutes of rated service time, the weight of the pressure volume portion is about 12.5 pounds.

14. The compressed gas cylinder of claim 13, wherein at least one of the length and the diameter of the pressure volume portion is at least slightly less than at least one of a corresponding length and diameter of a compressed gas cylinder for a self-contained breathing apparatus having a service pressure of about 4500 psig.

15. The compressed gas cylinder of claim 13, wherein the weight of the pressure volume portion is substantially less than a weight of a compressed gas cylinder for a self-contained breathing apparatus having a service pressure of about 4500 psig.

16. The compressed gas cylinder of claim 13, wherein the wall thickness comprises a combination of at least an inner liner and a shell.

17. The compressed gas cylinder of claim 13, wherein the pressure volume portion is constructed using at least one of aluminum, steel, carbon fiber, and fiberglass wrapped aluminum or steel.

* * * * *